Sept. 25, 1923.  
W. H. HERMANN  
1,469,012  
BEADING AND TRIMMING DEVICE FOR TIRE BUILDING MACHINES  
Filed Dec. 26, 1918  
2 Sheets-Sheet 2
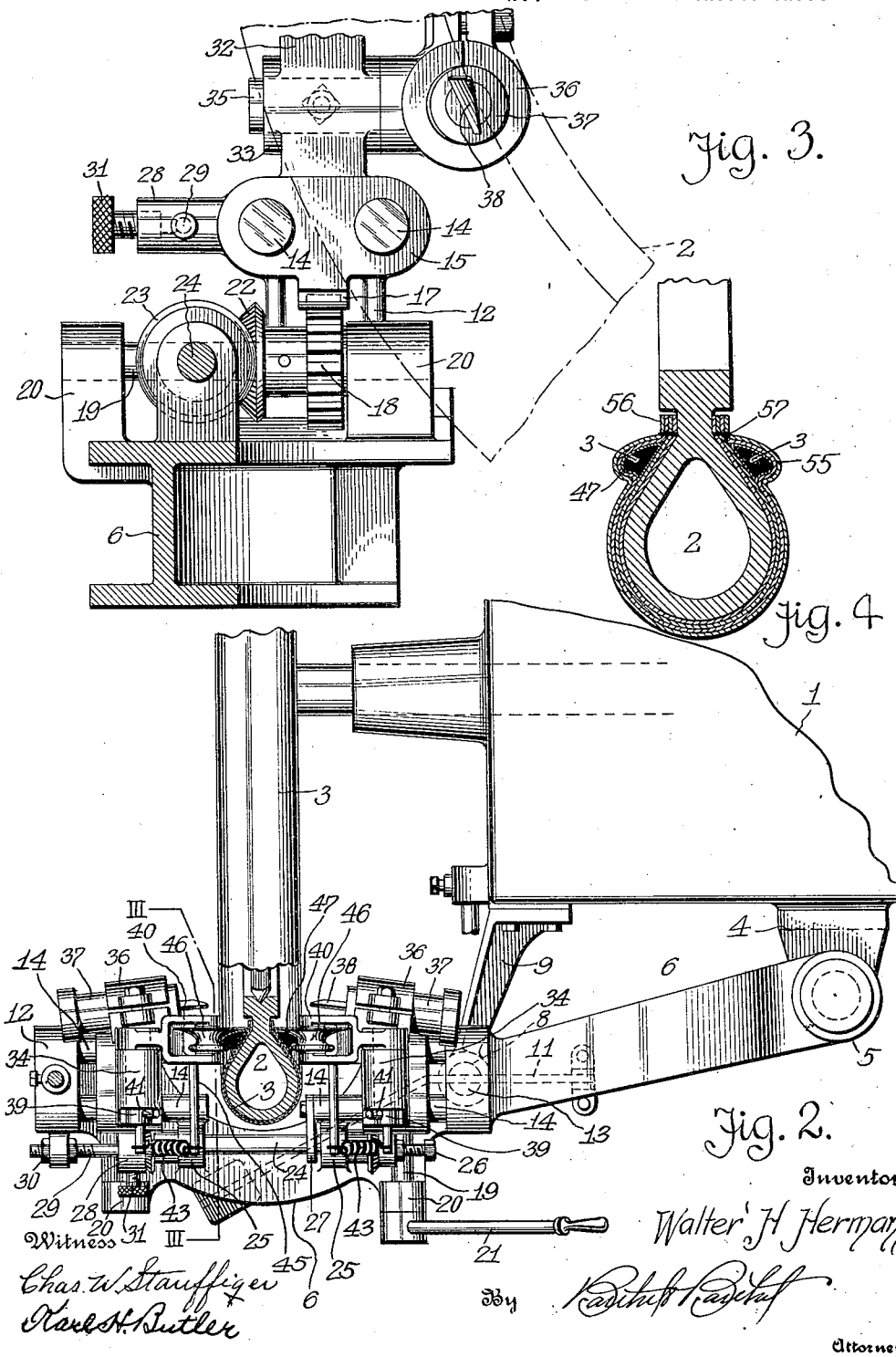

Patented Sept. 25, 1923.

1,469,012

UNITED STATES PATENT OFFICE.

WALTER H. HERMANN, OF LANCASTER, OHIO, ASSIGNOR TO THE HERMAN TIRE BUILDING MACHINE COMPANY, OF COLUMBUS, OHIO, A CORPORATION OF OHIO.

BEADING AND TRIMMING DEVICE FOR TIRE-BUILDING MACHINES.

Application filed December 26, 1918. Serial No. 268,403.

*To all whom it may concern:*

Be it known that I, WALTER H. HERMANN, a citizen of the United States of America, residing at Lancaster, in the county of Fairfield and State of Ohio, have invented certain new and useful Improvements in Beading and Trimming Devices for Tire-Building Machines, of which the following is a specification, reference being had therein to the accompanying drawings.

The primary object of my invention is to provide positive and reliable means, in a manner as hereinafter set forth, for evenly trimming tire bodies during the manufacture thereof, the trimming operation removing excess material built up into a tire body or carcass, and this is accomplished by maintaining the trimming means stationary and revolving the tire body relative thereto.

Another object of my invention is to provide a tire trimming mechanism that may be advantageously associated with a tire building machine, particularly of that type disclosed by my companion applications, filed December 26, 1918, Serial Nos. 268,402, and 268,401, said applications showing a rotary core or form on which a tire body may be built by applying material or stock thereto until a desired laminated structure is produced on the core or form. Provision is made in connection with these tire building machines for evenly and accurately applying the tire building material, and even with such accuracy, it is necessary that the edges of the material be cut and trimmed.

In applying the material to the core by hand it was impossible to always have the material properly placed, therefore it was necessary to use a width of material which would insure a desired laminated body. The width of the material necessitated trimming or cutting of the edges of the material after being applied to the core or form and consequently there was considerable waste. Insomuch that my tire building machines permit of the material being more evenly applied to the core or form, it is possible to use material of less width and consequently have less trimming, so by combining the trimming mechanism with my improved tire building machine, there is a saving of material and the trimming is more accurately performed.

Another object of my invention is the provision of novel means for applying clencher strips or beads to the annular edges of a tire body or outer casing, such application being made before the tire body has been trimmed by the mechanism previously mentioned. The strip applying means is associated with the trimming mechanism so that each can be brought into active relation to a tire body to operate upon the same, and this is accomplished while the tire body is on the core or form on which it has been fabricated.

A still further object is to accomplish the above results by a mechanical construction that insures uniformity in tires of a predetermined size and grade, and this mechanical construction may be hereinafter described and then claimed.

Reference will now be had to the drawings, wherein—

Fig. 2 is a plan of the same showing the tire body and strips in horizontal section, Fig. 3 is an enlarged cross sectional view taken on the line III—III of Fig. 2, and Fig. 4 is an enlarged cross sectional view of a portion of the core, showing the untrimmed edges of a tire body.

Figure 1:
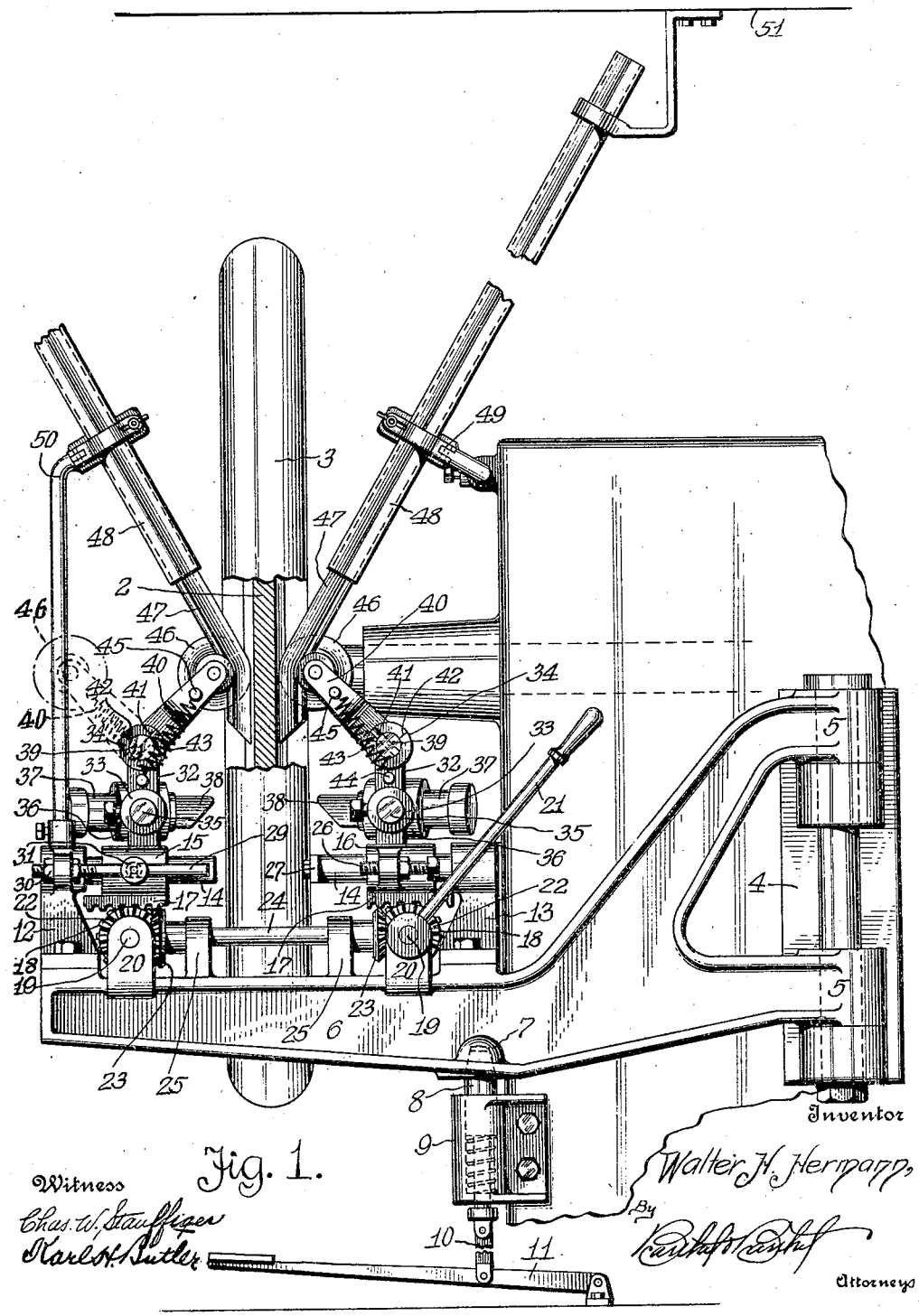
Figure 1 is a front elevation of the tire trimming and strip applying mechanism associated with a rotary core or form, showing a tire body, partly broken away and partly in section, with the strip applying means in active position.

In the drawings, the reference numeral 1 denotes a suitable support, for instance a housing having a rotary collapsible core or form 2 at the side thereof and on which a tire body or laminated structure 3 is built or constructed from strips of material or stock applied to the core from a tire building machine (not shown).

The housing 1 contains a source of power or power transmitting mechanism for imparting a rotary movement to the core 2 and it is after a tire body or laminated structure has been partly built up on the core 2 that my improved trimming and strip applying mechanism is brought into action.

The support or housing 1 is provided with a bracket 4 and pivotally connected to said bracket are the bearings 5 of an arm 6 that may be swung into an active position, contiguous to the core 2, or swung to an inactive position away from the core so as not to interfere with the building of a tire body on the core. To retain the arm 6 in an active position, as shown in Figs. 1 and 2, the lower edge of said arm has a socket 7 to receive a spring pressed plunger or detent 8 slidable in the outer end of a bracket 9 carried by the housing 1. The lower end of the plunger or detent 8 is pivotally connected by a link or rod 10 to a treadle 11 pivoted on the floor or suitable support below the arm 6 so that an operator or attendant of the tire building machine may release the arm 6 by foot pressure and manually swing the arm to one side. When it is desired to use the arm or place the same in an active position, it can be swung into engagement with the plunger or detent which will correctly position said arm and hold the same against accidental displacement during the use of the trimming or strip applying mechanism.

The outer end of the arm 6 is shaped to extend at the sides of the core 2 and said arm is provided with opposed posts 12 and 13, each supporting a pair of opposed guide rods 14.

Slidable on the guide rods 14 are heads 15 and 16 having the lower faces thereof provided with longitudinal racks 17 meshing with pinions 18 mounted on shafts 19 journaled in bearings 20, carried by the arm 6. The shaft 19, adjacent the post 13, has a crank or lever 21 so that this particular shaft may be rocked. Mounted on both of the shafts 19 are beveled gear wheels 22 meshing with beveled gear wheels 23 mounted on the ends of a shaft 24, journaled in bearings 25, carried by the arm 6. It is therefore possible for an operator to swing the crank or lever 21 and through the medium of the beveled gear wheels, pinions and racks impart a reciprocatory movement to the heads 15 and 16, causing said heads to slide on the guide rods 14 to and from each other.

The inward movement of the heads 15 and 16 is limited by a set screw 26, carried by the head 16, impinging against a stop 27, carried by one of the slide rods 14, as best shown in Fig. 1, and to lock the heads 15 and 16, during the operation of the strip applying means, the head 16 has an apertured boss or lug 28 slidable on a rod 29, adjustably supported, as at 30, from the post 12. The apertured boss or lug 28 is provided with a set screw 31 that may enter a groove or notch in the rod 29 and positively lock the heads 15 and 16 against movement and in inactive position. The set screw 26 and the stop 27 define the extreme active position of the heads 15 and 16, and the set screw 31 and rod 29 define an inactive position of said heads.

The heads 15 and 16 are provided with uprights 32 and each upright has bearings 33 and 34. Mounted in the bearings 33 are the studs 35 of clamping members 36, said clamping members supporting chucks or holders 37 for knives or trimming devices 38. The knives or trimming devices have beveled cutting edges and are firmly held by the chuck or holders 37 which are positioned at an angle relative to the studs 35, the angularity of the knives or trimming devices, relative to the core 2 being such that the knives or trimming devices will be correctly positioned, when swung inwardly, for expeditiously removing excess material from the tire body or laminated structure 3. The knives or trimming devices 38 are not only adjustable in the chucks or holders 37, but may be adjusted by either shifting the chucks or holders 37 in the clamping members 36 or shifting the studs 37 in the bearings 33.

Journaled in the bearings 34 are rock shafts 39 having the ends thereof provided with bifurcated or forked arms 40 and stub pins 41. The stub pins 41 are adapted to engage shoulders 42 of the bearings 34 and define the angular position of the arms 40 relative to the uprights 32. The stub pins 41 are maintained in engagement with either of the shoulders 42 by coiled retractile springs 43 connecting side pins 44 and 45 carried by the uprights 32 and the arms 40 respectively, the side pins 45 being of a sufficient length to permit of the springs 43 being located at the front sides of the mechanism. The retractile force of the springs 43 will maintain the arms 40 either in an active position as shown by full lines in Fig. 1, or an inactive position as shown by the dotted position of one of the arms in Fig. 1. It is therefore possible to manually place the arms 40 in position for applying strips or to swing the arms to inactive positions so as to not interfere with any trimming operation.

Rotatable in the outer ends of the bifurcated or forked arms 40 are strip applying wheels or rollers 46 having the peripheries thereof shaped for engaging clencher strips or beads 47 which are applied to the outer sides of the tire body 3, at the annular inner edges thereof, as shown in Fig. 2. The clencher strips or beads 47 are made of a suitable material in an adhesive sheath so that the strips will adhere to the tire body as applied thereto by pressure. The strips 47 are fed into position between the tire body 3 and the rollers 46 by angularly disposed chutes or guide members 48, one of which may have its lower end supported by an adjustable bracket 49 from the housing 1, and the other by an adjustable bracket 50 carried by the post 12. The upper end of the chutes or guide members 48 may be suitably suspended or held relative to a ceiling or other support 51 and the chutes or guide members may receive the strips from suitable rolls or holders in proximity to the upper end thereof.

Considering the operation of the trimming devices and the strip applying means, and assuming that the arm 6 is in an inactive position and sufficient material or the inner lining 3 has been applied to the core 2 to constitute a tire body, the clencher strips or beads 47 are now brought down into engagement with the sides of the tire body 3 and the pressure rollers 46 swung to an active position, as shown in Fig. 1. The strips or beads will adhere to the side walls of the tire body or inner lining 3 and as the core 2 is revolved the strips will be applied to the tire body. The core 2 can be stopped and the strips 47 cut so that the ends thereof may be placed in abutting relation, it being preferable to cut the ends of the strip bias or at an angle. After this operation, additional stock or material 55 is applied, as shown in Fig. 4, leaving the untrimmed edges 56 and the additional stock enclosing the clencher strips. To trim off the edges 56, at the places indicated at 57, the arm 6 is swung to an active position and the operator throws the crank or lever 21 to the left thereby imparting movement to the shafts 19 and 24, causing the heads 15 and 16 to be shifted inwardly, and consequently the knives or trimming devices 38. These knives or trimming devices are simultaneously brought into engagement with the material or stock applied to the core 2 and the edges of the material are trimmed at the neck portion of said core and at the places 57. This operation is carried on while the arms 40 occupy inactive positions away from the core and as soon as the material has been trimmed the crank or lever 21 is swung to the right, thereby shifting the knives or trimming devices out of engagement with the tire body and away from the core. After this operation the plunger or detent 8 lowered, the arm 6 swung to one side, and the tire body can be removed by collapsing the core 2.

What I claim is:—

1. The combination of a rotary core adapted to have a tire body fabricated thereon, an arm adapted to be swung in a horizontal plane to and from said core, opposed uprights on said arm movable to and from each other, means connecting said uprights so that said uprights may be adjusted to and from each other in synchronism, opposed body trimming means carried by the upper ends of said uprights disposed in a horizontal plane and at an angle to the vertical plane of said core, and strip applying means carried by said uprights and disposed in a vertical plane.

2. The combination set forth in claim 1, and wherein the uprights are slidable to and from each other and said strip applying means is in the form of pivoted arms on said uprights and normally maintained in active positions by means connecting the outer ends of said arms to said uprights.

3. A tire trimming device comprising an arm having one end thereof pivoted and its opposite end free to swing in a horizontal plane, heads, uprights thereon, strip applying devices on said uprights, means connecting said uprights and said strip applying devices adapted for maintaining said strip applying devices in active and inactive positions relative to said uprights, adjustable knives supported by said heads, and means on the outer end of said pivoted arm supporting said heads and adapted for simultaneously moving said heads to and from each other.

4. The combination of a housing, a rotary core at the sides thereof and adapted to have the tire body thereon, an arm supported by said housing and movable to and from said core, means adapted for holding said arm in proximity to said core, means on said arm adapted for trimming both sides of a tire body on said core, and means carried by said arm adapted for simultaneously applying bead strips to the sides of the tire body carried by said core.

In testimony whereof I affix my signature in the presence of two witnesses.

WALTER H. HERMANN.

Witnesses:
ANNA M. DORR,
KARL H. BUTLER.